United States Patent [19]

Grimsley

[11] Patent Number: 5,056,635
[45] Date of Patent: Oct. 15, 1991

[54] REVERSIBLE FREE WHEELING MECHANICAL DRIVE MECHANISM

[76] Inventor: John W. Grimsley, 201 NW. 41st St., Pompano Beach, Fla. 33064

[21] Appl. No.: 608,198

[22] Filed: Nov. 2, 1990

Related U.S. Application Data

[63] Continuation-in-part of Ser. No. 335,887, Apr. 10, 1989, abandoned.

[51] Int. Cl.⁵ .............................................. F16D 41/08
[52] U.S. Cl. ................................... 192/43.2; 192/47; 81/63.1
[58] Field of Search .................... 192/41 A, 43, 43.1, 192/43.2, 45.1, 45.2, 47; 81/60, 62, 63.1

[56] References Cited

U.S. PATENT DOCUMENTS

| | | | |
|---|---|---|---|
| 2,404,092 | 7/1946 | Reynolds | 81/62 |
| 3,363,733 | 1/1968 | Titt | 192/45.1 |
| 3,534,836 | 10/1970 | Dare | 192/43.1 |
| 3,599,767 | 8/1971 | Sederquist | 192/43.1 |

Primary Examiner—Richard Lorence
Attorney, Agent, or Firm—Joseph Zallen

[57] ABSTRACT

A reversible mechanical drive unit capable of being manually shiftable between a locked neutral position and opposite reversed direction, positive drive positions, and useable in a variety of applications including a reversibly operatable hand tool. The mechanism includes a plurality of pivotally mounted locking cams or pawls selectively positioned between wedged locking engagement with an inner hub and an outer carrier for concurrent driving engagement therebetween.

1 Claim, 5 Drawing Sheets

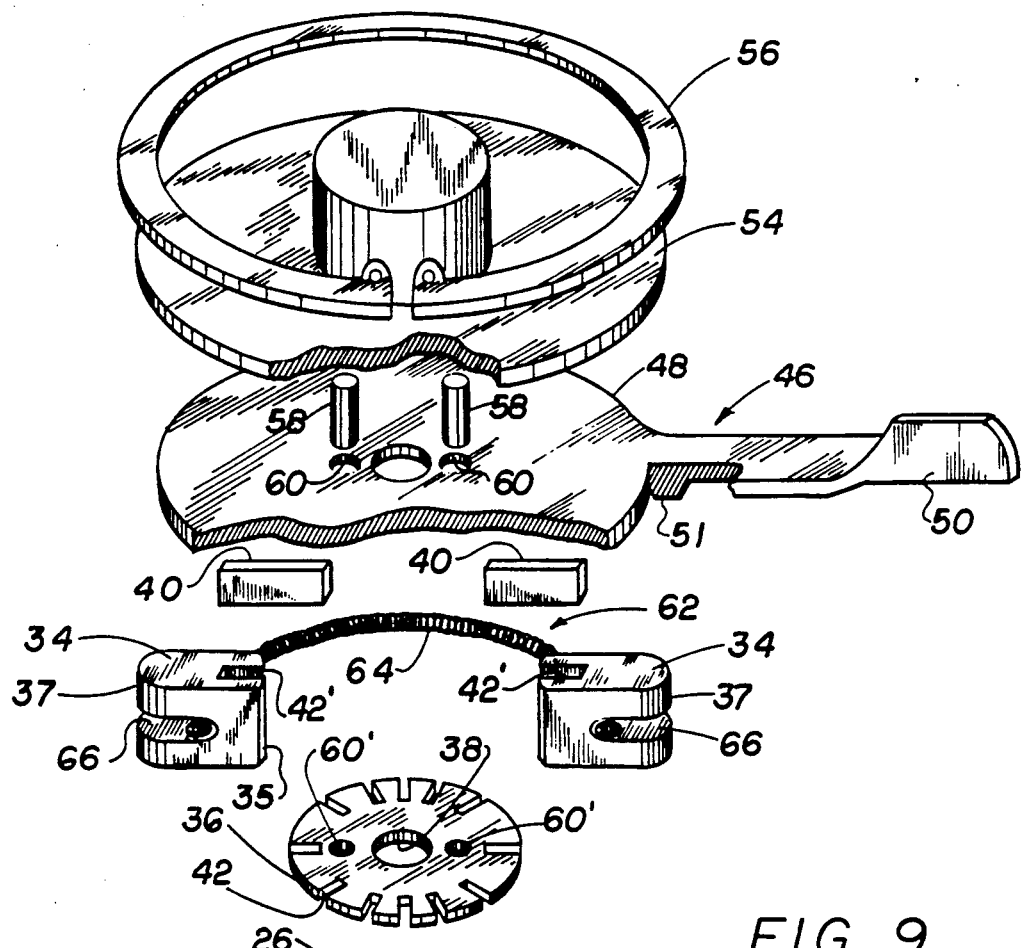
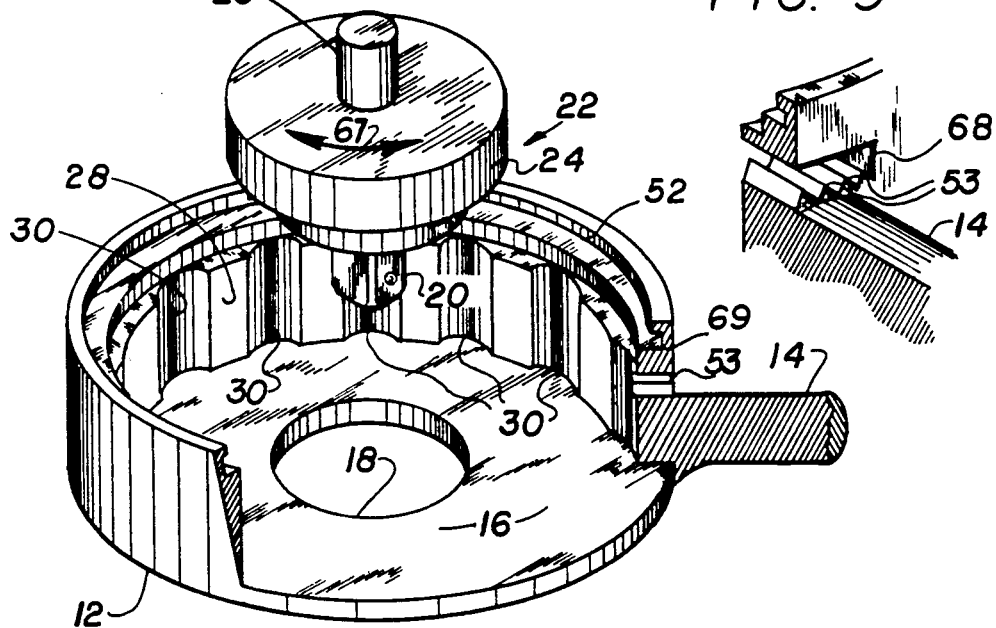
FIG. 9
FIG. 1

REVERSIBLE FREE WHEELING MECHANICAL DRIVE MECHANISM

This application is a continuation-in-part of Ser. No. 07/335,887, filed Apr. 10, 1989, now abandoned and incorporated herein by reference.

BACKGROUND OF THE INVENTION

1. Field of the Invention

A mechanical drive mechanism used to transfer driving force between at least a first member and a second member in either of two opposite, reverse directions with a minimal amount of lost motion and further positionable in a locked neutral position. Either the first or second member can be utilized as the input or output member and the mechanism can be structured shiftable between the various positive drive or neutral positions.

2. Description of the Prior Art

The prior art is replete with mechanical drive assemblies and/or clutch mechanisms specifically designed to transfer driving force from an input member to an output member. Typically, the goal for which such mechanisms are designed is to operate in a most efficient manner by incorporating a minimal amount of lost motion and further wherein certain ones of the mechanisms are capable of being operated in reverse, drive directions. One specific field of application commonly incorporating such drive mechanisms is a ratchet assembly or the like utilized in hand tools. Such ratchet assembly or mechanism is disclosed in the U.S. patent to Dane, U.S. Pat. No. 3,534,836 directed to a ratcheting device comprising a housing, a socket member rotatably mounted therein and a number of paired sprag members pivotally mounted in spaced notches on the socket member. A control structure is mounted on the housing for rotation in either direction to engage and pivot a desired one of each sprag pair away from the housing. The other sprag of each pair will permit rotation of the housing relative to the socket member in the direction of the pivoted sprag but will jam if the housing is rotated in the other rotation thereby providing a ratcheting action between the housing and the socket.

The U.S. patent to Sederquist, U.S. Pat. No. 3,599,767 discloses a reversible sprag clutch having a plurality of sprags disposed between spaced, opposed circular surfaces of two concentric members forming races for convex-convex contact wherein each of the sprags has two distinct inner cam surfaces, one of which can be employed to prevent relative clockwise rotation between the concentric members and the other of which can be employed to prevent counterclockwise rotation of the concentric members. The structure is so designed that the clutch transmitting torque in one direction will allow unrestricted rotation in the opposite direction depending upon which of the inner cam surfaces is cooperating with the inner race. The utilization of a selector ring is provided to bias the individual sprags to selectively reverse the direction of torque transmission and allow "free-wheeling" in the opposite direction.

The patent to Titt, U.S. Pat. No. 3,363,733; discloses an over running clutch having inner and outer rotary members which define between themselves an annular space in which a plurality of motion transmitting bodies are situated for tilting movement between clamped positions where these bodies are respectively clamped between clutch members for transmitting rotary motion therebetween and unclamped positions where the bodies are respectively in positions permitting free rotary movement of one of the clutch members relative to the other.

While the structures disclosed in the above set forth patents are assumed to be operable for their intended functions, each may be considered to be somewhat over complicated by utilizing a plurality of cooperative moving parts, the inability to assume a readily reversed, position drive direction of travel and force transmission as well as the inability to selectively assume a locked neutral position without significant modification of the structural features thereof.

SUMMARY OF THE INVENTION

The present invention relates to a reversible, free-wheeling mechanical drive assembly of the type useable for a variety of practical applications and the transfer of driving force from an input member to an output member with a minimum or practically insignificant amount of lost motion.

More specifically, the drive mechanism of the present invention is capable of being positionable between a neutral position and either of two reversed, opposite drive positions. A carrier structure is located concentrically exteriorly to an inner hub assembly and rotatable relative to thereto and respectively including an outer contact wall and an inner contact surface. A locking assembly is positionable therebetween and serves to interconnect the carrier structure to the hub assembly for concurrent movement with one another in a common direction upon concurrent positive inner engagement of an outer drive surface and in inner drive surface respectively, such that the carrier structure and the hub assembly are effectively locked to one another. In such an occurrence, and as will be explained in greater detail hereinafter, either the carrier structure or the hub assembly can serve as the output or input member such that when positive driving torque is applied to either, driving force is transferred through the locked assembly to the other member which thereby serves as the driven or output member.

More specifically, the locking assembly of the present invention comprises a plurality of spaced apart pivotally mounted locking cams. Each of the locking cams is defined at opposite ends thereof to include respectively, an outer drive surface disposable in locking or wedging engagement with the inner drive wall and an inner drive surface concurrently disposed in locking engagement with the outer contact surface of the hub assembly. Each of the plurality of locking cams are independently pivotal between one of three positions. Such three positions include a neutral locked position. The other two of the aforementioned three positions are defined by positive drive positions in opposite directions.

Further, a flexible holding means means, such as a coil spring, is interconnected to the plurality of locking cams so as to maintain the inner drive surface of each into "rolling" contact or engagement with the outer contact surface of the hub assembly. Therefore, rotation of the hub assembly in either direction will be at least in part serve to effect, in at least one embodiment, a pivotal movement of each of the cam assemblies in the direction of rotation of the hub member thereby forcing the opposite end thereof and the outer drive surface associated therewith into a wedged, locking engagement with the inner contact wall formed on the carrier structure.

As set forth above, a shifter assembly or mechanism is associated with the subject invention so as to provide for positioning of the locking means and particularly the plurality of locking cams in one of the aforementioned three positions to effect either locked, or power transfer in one of two reversible, opposite directions. A manually selectable structural configuration of the subject mechanism would of course, readily lend itself to a hand tool or like instrument of the type useable similarly to a ratcheting mechanism.

The invention accordingly comprises the features of construction, a combination of elements, an arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is an exploded view with partial cutaway of a ratchet wrench made in accordance with this present invention.

FIG. 9 is a view of the slots and recesses for the shifter to engage a selected position.

Like reference numerals refer to like parts throughout the several views of the drawings.

DETAILED DESCRIPTION OF THE PREFERRED EMBODIMENT

Figure 2:
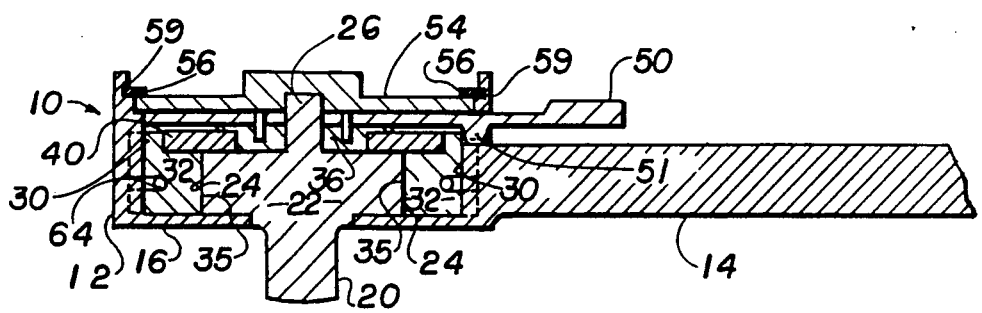
FIG. 2 is a longitudinal sectional view in partial cutaway of the embodiment of FIG. 1.
Figure 3:
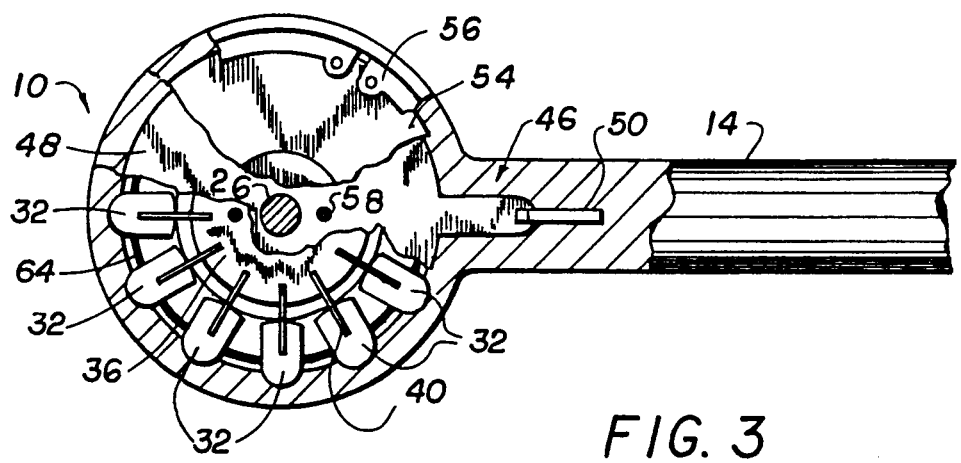
FIG. 3 is a top view in partial cut-away showing internal components.

As shown in FIG. 1, the mechanism is represented in exploded form in what may be considered a commercial application of the mechanism generally indicated as being a hand tool serving as a ratchet assembly or the like and including a carrier 12 having an elongated handle or like element 14 attached to an exterior portion thereof and extending outwardly therefrom. The carrier structure 12 has a base 16 with a central opening as at 18 through which a protruding operable member as at 20 being considered part of a hub assembly generally indicated as 22 may protrude for exterior excessability. The input and/or output member 20 may be conventionally configured so as to be part of a socket wrench or like element wherein the entire mechanism may serve as a ratcheting device or ratchet type hand tool as will be apparent. The hub assembly 22 includes an outer contact surface 24 having a substantially annular configuration and an oppositely disposed protruding member as at 26 wherein both the members 20 and 26 are affixed to and rotate with the hub assembly 22. FIGS. 2 and 3 show the mechanism 10 in its assembled, operative condition. The carrier 12 further includes an interior contact wall 28 having a plurality of spaced apart curvilinear recesses 30 disposed continuously along the annular length thereof. Each of the recesses is dimensioned, disposed and configured to cooperatively receive (depending upon the operative position) one end of a different one of a plurality of locking cams 34 as will be explained in greater detail with regard to FIGS. 4, 5, and 6.

The plurality of locking cams define, in part, a locking means or more particularly force transferring means which serves to lockingly interengage, for concurrent movement in a common direction, both the hub assembly 22 and the carrier structure 12. More specifically, interaction of each of the cams 32, which are independently pivotally mounted in a collective annular array, serves to transfer a driving force between the carrier structures 12 and hub assembly 22, dependent upon to which of these members positive torque or input force is initially applied. In the embodiment shown in FIGS. 1, 2, and 3, the application of turning force on the handle 14 will apply positive torque in either direction to the carrier structure 12. Such torque will in turn be transmitted to the hub assembly 22 through the provision of a locking means, defined in part by a plurality of pivotal locking cams, to be described in greater detail with reference to FIGS. 4 through 8. Therefore, in the embodiments disclosed in FIGS. 1 through 3, the input member would be the carrier structure 12 and the output member would be the hub assembly 22. Obviously, dependent upon the specific practical or commercial application of the subject mechanism, either the carrier structure 12 or the hub assembly 22 can serve as either the input or the output member.

Other structural features associated with the embodiment of FIGS. 1, 2, and 3 include the aforementioned locking means including a locking plate 36 having a central aperture 38 allowing passage therethrough of fixed member 26 attached to the hub assembly 22. The locking plate 36 is allowed to rotate in either of two opposite directions relative to the member 26 and hub assembly 22. The direction of rotation of the locking plate 36 serves to effect the direction of pivotal movement of each of the plurality of locking cams 34 due, at least in part, to their interconnection of the locking cams 34 with the locking plate 36 by virtue of a plurality of locking members 40. These locking members 40 are formed from a flexible, resilient material, such as metal, plastic or the like. One end of members 40 is placed in an appropriate slot as at 42 and the opposite end is placed in a correspondingly disposed receiving slot 42' formed in an inner end of each of the locking cams 34. Therefore, as shown in FIG. 3, the number of locking cams 34 is equal to the number of locking members 40 in that each of the locking cams are independently pivotal relative to the inner contact wall 28 of the carrier structure 12 and the outer contact surface 24 of the hub assembly 22.

As set forth above, a shifter mechanism generally indicated as at 46 includes a shifter plate 48 and an outwardly extending lever or manually positionable knob or like element as at 50. The plate 48 extends over the open end or face as at 52 of the cover structure 12 and rides immediately beneath a cover plate 54 both of which are held in place by a resilient snap ring or like keeper mechanism 56. The locking plate 36 rotates in opposite directions with the shifter plate 48 by virtue of two interconnecting dowels 58 extending through appropriate apertures 60 and 60' as best shown in FIG. 1.

One feature of the present invention is the existence of a cam holding means generally indicated as 62 and including a substantially annularly configured member or spring element 64 serving to concurrently engage along its annular length each of the plurality of locking cams 34 by virtue of receiving channels 66 formed therein. The biasing member 64 is disposed and dimensioned to maintain a rolling or rotational engagement with an inner drive surface 35 of each of the locking cams 34 with the outer contact surface 24 of the hub assembly 22. Accordingly, and upon proper positioning of the selector mechanism 46, rotation of the hub assembly 22 will occur in either of two opposite directions, as indicated by directional arrow 67. This causes pivotal movement of each of the locking cams 34 or more particularly the inner ends thereof associated with the inner drive surface 35 in the same direction of rotation as the outer contact surface 24. At the same time, each of the outer drive surfaces 37 will cooperate in either a spaced apart relation or angularly oriented and "wedged" locking engagement with the exposed surfaces of respective ones of the recesses 30 integrally formed in the inner contact wall 28.

Specific structural features utilized to operatively mount the various components of the embodiment of FIG. 1 include an outwardly extending slot as at 68 dimensioned and disposed to allow outward extension of the manually operable member 50 therethrough as well as to allow lateral movement thereof along the length of the slot. A detent 51 protrudes from the under surface of the member 50 into removable locking engagement with one of the three corresponding recesses as at 53 to accomplish placement of the manual member 50, shifter plate 48 and locking plate 36, in one of the aforementioned three neutral or opposite, positive drive positions. The elongated annular channel 69 is provided to receive the snap O-ring 56 as shown in FIGS. 1 and 2.

Figure 4:
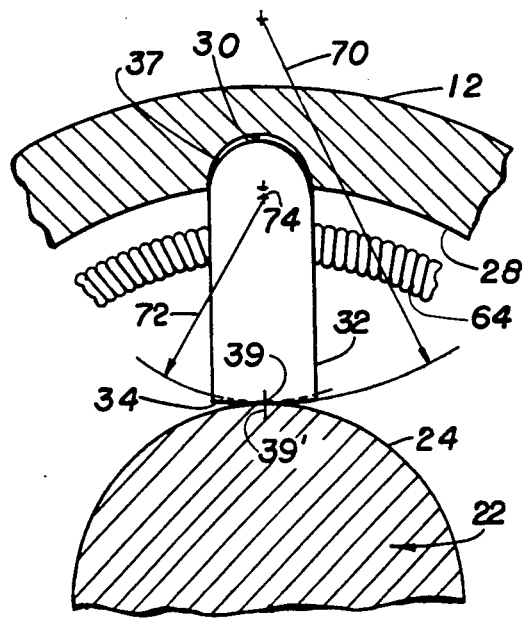
FIGS. 4, 5 and 6 are schematic views of three operable positions.
Figure 5:
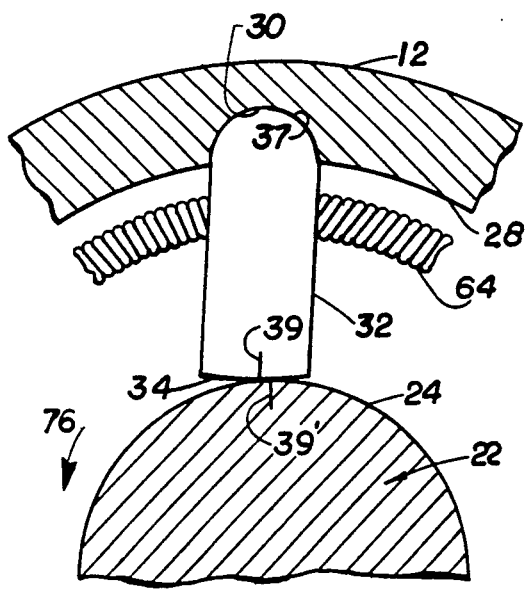
Figure 6:
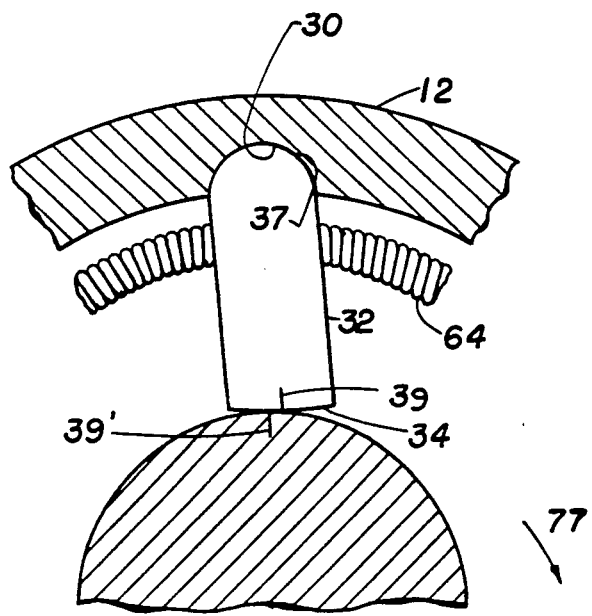
Figure 10:
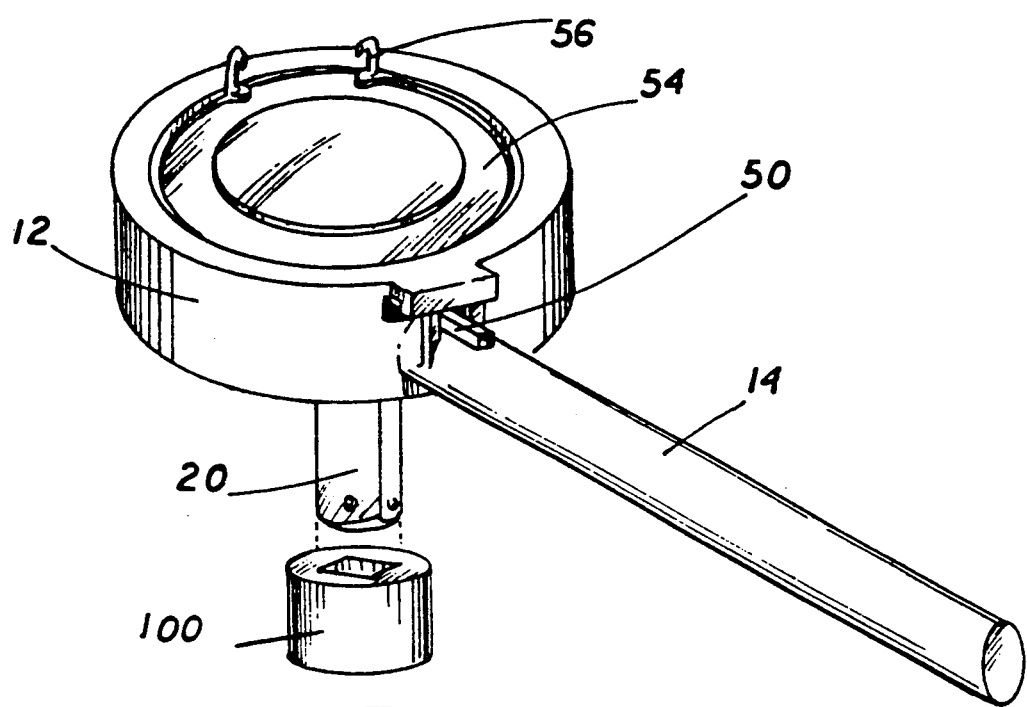
FIG. 10 is a perspective view of the ratchet wrench of FIG. 1 being applied to a tool to be turned.
Figure 11:
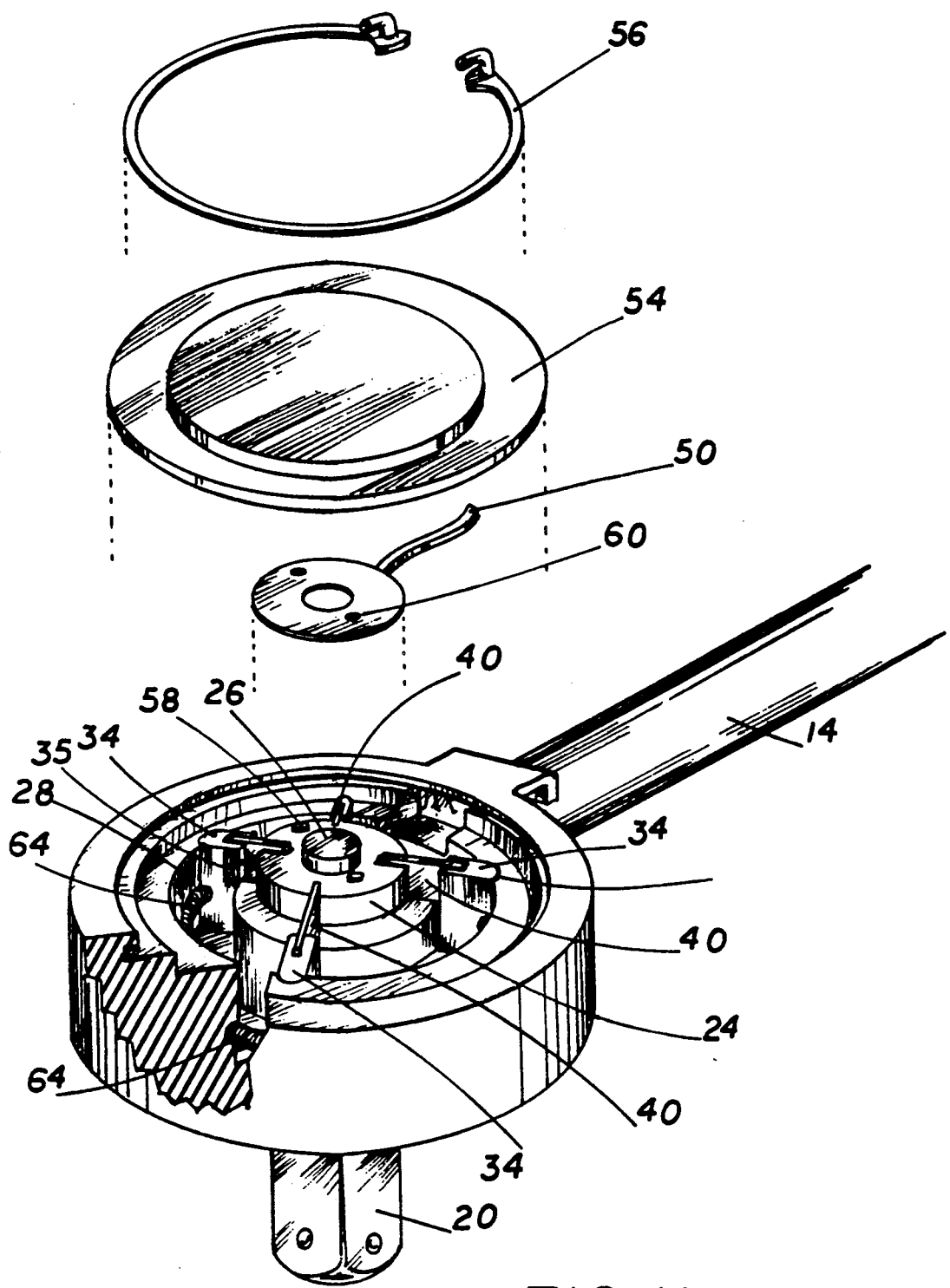
FIG. 11 is a view of the ratchet wrench of FIG. 1 in partially assembled form and partially exploded form.

With regard to FIGS. 4, 5, and 6, FIG. 4 represents a neutral position of the cams 32 wherein the central longitudinal axis of the cams is disposed in a true radial orientation relative to the center of the hub assembly 22. In such a neutral position, it is seen that the outer drive surface 37 is maintained in spaced relation to the majority of the exposed surface of the corresponding recess 30 while the point of contact of the inner drive surface 34 is substantially centered as indicated by imaginary reference lines 39 and 39' on the engaging surfaces 34 and 24. As also demonstrated in FIG. 4, the radius which defines the curvilinearly configured inner contact surface 37 of each of the cams 34 is defined by a radius 70. Radius 70 has a first predetermined length greater than the length of pivotal radius 72 extending from the pivot point 74 through an arc which the center contact point represented by reference 39, on the inner drive surface 34 travels. The pivotal radius 72, being of a second predetermined length, will always be lesser than the length of the radius 70 defining the arc of the curved surface 34. Accordingly, rotation of the hub assembly in the direction indicated by directional arrow 76 will cause a pivotal movement of each of the cams 32 and particularly the inner drive surface 34 in the same direction causing a displacement of the reference point 39 respectively of the inner drive surface 34 and outer contact surface 24. However, the opposite end of each of the cams 32 including the outer drive surface 37 will be wedged into a locking engagement with the exposed surface of each of the respective recesses 30 thereby causing a locking engagement between the hub 22 and the carrier structure 12. This in turn causes a forcing of the rotation in a common direction of both the carrier structure and hub assembly. The device does not freewheel in the neutral position. It locks in the neutral position.

The neutral position is functional. It serves to allow the cams to move in either direction and lock in the direction that the handle is turned, both left and right. In the neutral position the wrench serves as a direct drive tool for tight nuts and bolts that have to be jogged back and forth (turned left and right) to free them. In this neutral position the turning head and handle will rotate only a few degrees in relation to one another, depending on the accuracy of the machine parts. The shifting mechanism is simple and positive with the external shifting handle. The important working components are the handle, turning head, cams, shift springs, cam seating springs, and shifting linkage.

FIG. 6 represents a reversing of the direction of rotation of the hub assembly 22 and the resulting positioning of each of the cams 32.

Figure 7:
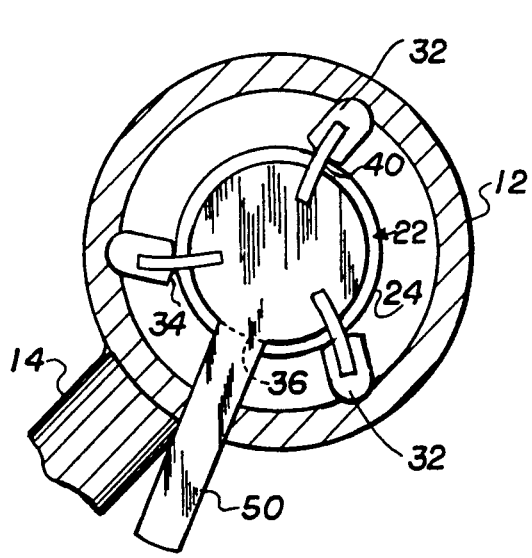
FIGS. 7 and 8 are schematic representations equivalent to the operable position of the subject mechanism as shown respectively in FIGS. 5 and 6.
Figure 8:
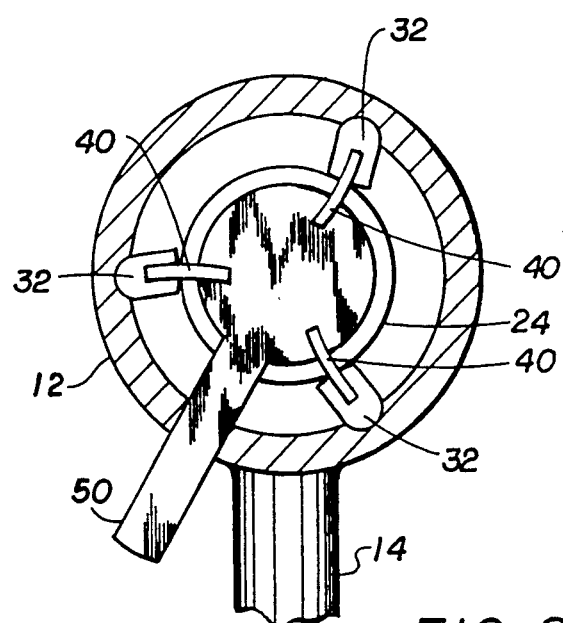

FIGS. 7 and 8 are equivalent to the positioning of the components as shown in FIGS. 5 and 6 respectively, wherein the mechanism is operatively reversed and torque is applied in an opposite direction. FIGS. 7 and 8 demonstrate the effect and positioning of the locking members 40 relative to the plurality of cams 32.

I claim:

1. A reversible, free-wheeling ratchet mechanism characterized as being shiftable from a first direction position to locked neutral position and to a second direction position, including in combination:
   (a) driving means (20);
   (b) drive locking means (36);
   (c) a plurality of locking cams (34), each having a channel (66), a curved cam outer surface (37), and slot (42');
   (d) a plurality of flexible, resilient locking members (40) each engageable with a slot (42) in locking means (36) and with a slot (42') in said locking cam (34);
   (e) annular coiled spring means (64) extending through said channels (66);
   (f) body means (12) having inner recesses (30) engageable with said cam surfaces (37);
   (g) handle means (14) for moving said body means (12); and
   (h) shifter means (46) connected to said drive locking means (36) for selecting first, locked neutral and second positions.

* * * * *